United States Patent
Kurchuk

(10) Patent No.: US 6,195,535 B1
(45) Date of Patent: Feb. 27, 2001

(54) HIGH POWER WIRELESS TELEPHONE WITH OVER-VOLTAGE PROTECTION DISABLING CIRCUIT

(75) Inventor: Boris Kurchuk, East Windsor, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/148,448

(22) Filed: Sep. 4, 1998

(51) Int. Cl.[7] ............................................. H04B 1/44
(52) U.S. Cl. ................................... 455/83; 455/217
(58) Field of Search ............................. 455/83, 217, 78, 455/82, 84, 550, 90, 575, 219, 221, 250.1, 249.1; 370/278, 282, 287, 288

(56) References Cited

U.S. PATENT DOCUMENTS

| | | | |
|---|---|---|---|
| 4,155,041 | * | 5/1979 | Burns et al. ........................ 455/501 |
| 4,181,890 | * | 1/1980 | Yamamoto .......................... 455/143 |
| 4,493,655 | * | 1/1985 | Groff .................................. 434/351 |
| 4,612,669 | * | 9/1986 | Nossen ............................... 455/123 |
| 5,450,611 | * | 9/1995 | Bonvallet et al. .................. 455/509 |
| 5,477,532 | * | 12/1995 | Hoshigami et al. ................ 455/83 |
| 5,481,571 | * | 1/1996 | Balachandran et al. ........... 375/347 |
| 5,548,239 | * | 8/1996 | Kohama ............................. 455/82 |
| 5,745,844 | * | 4/1998 | Kromer et al. ..................... 455/250.1 |
| 5,878,331 | * | 3/1999 | Yamamoto et al. ................ 455/83 |
| 5,911,116 | * | 6/1999 | Nosswitz ........................... 455/83 |
| 5,963,855 | * | 10/1999 | Lussenhop et al. ................ 455/217 |
| 5,974,040 | * | 10/1999 | Kimura .............................. 455/250.1 |
| 5,978,665 | * | 11/1999 | Kim ................................... 455/250.1 |
| 5,999,578 | * | 12/1999 | Ha ...................................... 455/250.1 |
| 6,009,316 | * | 12/1999 | Tsuji ................................... 455/83 |

* cited by examiner

*Primary Examiner*—Edward F. Urban
*Assistant Examiner*—Rafael Perez-Gutierrez

(57) ABSTRACT

A transceiver is disclosed for use in a wireless handset. The transceiver includes a switch for connecting an antenna, one at a time, to a receiver or to a transmitter. In a reception sub-frame, a limiting circuit switches the switch to an attenuated mode when an output signal of the receiver exceeds a predetermined value. The transceiver further includes a disabling circuit which disables the limiting circuit in response to a disabling signal provided to the disabling circuit when the transceiver is in a traffic mode. In addition, a disabling switch is provided which is activated in the traffic mode to provide the disabling signal. The disabling switch includes a light emitting diode, or is included in a controller of the transceiver. The disabling circuit may include a resistive network, an AND gate, a multi-vibrator, or a timer for disabling the limiting circuit in response to the disabling signal.

21 Claims, 11 Drawing Sheets

HIGH POWER WIRELESS TELEPHONE WITH OVER-VOLTAGE PROTECTION DISABLING CIRCUIT

CROSS REFERENCE TO RELATED APPLICATION

U.S. patent application Ser. No. 09/099,251, entitled "High Power Wireless Telephone With Over-Voltage Protection", filed on Jun. 18, 1998, for Boris Kurchuk is assigned to the assignee hereof and contains subject matter related to the subject matter of the present patent application. The content of the above-listed patent application is incorporated herein by reference.

BACKGROUND OF THE INVENTION

1. Field of the Invention

The present invention is directed to a high power wireless telephone with an over-voltage protection circuit that prevents receiver saturation, and more particularly, to a high power digital cordless telephone with a disabling circuit for disabling the over-voltage protection circuit once a link has been established between the wireless telephone and its base station.

2. Discussion of the Prior Art

Wireless telephones and base stations each has a radio frequency (RF) transmitter section and a receiver section, the combination of which is often referred to as a transceiver. The RF transmitter and receiver have been integrated on monolithic integrated chips (ICs) which are widely used in wireless communications. The receive section of a mobile telephone system is typically formed on a single IC and contains an input low noise amplifier (LNA), a mixer, and an oscillator. Such ICs containing transmitter or receiver sections provide low cost, low power consumption, and small size solutions for analog and digital cordless/wireless telephones. In addition, these ICs work very well at low input power signal levels.

One of the main methods to increase phone range is to increase its output power. However, power levels larger than a certain level overload the front end (input) RF circuits of the receiver. This occurs when the handset radio is too close to the base radio, for example, when the cordless handset is in the charging cradle. Overloading of the receiver (RF IC) causes various problems, such as preventing a link between the handset and the base from being established, as well as increasing noise and the bit error rate (BER) of the received signal.

The transmitter sections of both the handset and the base station have power control to increase transmission power when the distance therebetween increases, and to decrease transmission power when the wireless telephone is close to its base. One reason for power control is to prevent saturation or overload of the LNA located in the receiver of the handset or the base.

Power control is particularly important for high power cordless telephones having at least two handsets and one base, where each handset is at a different distance from the base. For example, one handset is on the base cradle for battery charging while the other handset is far away, such as a mile away for high power cordless phones. In this case, the base must transmit with high power to establish a link with the far handset. Without power control, the near handset receiver would be overloaded, thus increasing BER and preventing establishment of a link between the near handset and the base.

In the case of an overloaded receiver, there are several options to establish a link. One option is increase the minimum distance between handset radio and base radio. Another option is to decrease the output power of the transmitter, and hence reduce the maximum range of the telephone. However, the reduced power may not be sufficient to establish a link with the far handset. A further option is to reduce the received RF input power level of the receiver by implementing special RF limiting circuits, referred to as front end over-voltage protection (OVPT) circuits.

Different types of RF limiting or OVPT circuits have been used in the input RF circuit of the receiver section, typically between the LNA and the antenna, to protect the input RF circuits by reducing the amplitude of received RF signal. Such RF limiting circuits include Shottky diode limiters, PIN diode limiters and ferrite limiters. However, these conventional OVPT circuits add to the loss of the input RF circuits, thus reducing the levels of the received signals even when no reduction is desired. Further, OVPT circuits are often activated to lower the level of the signal provided to the receiver during data or voice thus causing data corruption and unwanted noise, such as clicking sounds during the voice conversation referred to as pops or clicks.

Accordingly, there is need for an OVPT circuit that allows establishment of links between a base station and near or far handsets, and does not turn off during voice or data reception, thus preventing data corruption, pops or clicks, and degradation of SNR and BER.

SUMMARY OF THE INVENTION

The object of the present invention is to provide a transceiver for high power wireless telephones which eliminates the problems of conventional high power wireless telephones.

Another object of the present invention is to provide a transceiver with a over-voltage protection circuit that does not turn off during voice or data reception.

Yet another object of the present invention is to provide a transceiver which provides links between a base station and near or far handsets.

A further object of the present invention is to provide a transceiver which is inexpensive and provides no additional loss.

A still further object of the present invention is to provide a transceiver which consumes minimal area and allows miniaturization of wireless systems.

Another object of the present invention is to provide a transceiver which provides fast power control to prevent receiver overloading without degrading receiver sensitivity or signal to noise ratio (SNR), bit error rate (BER), and telephone range.

The present invention accomplishes the above and other objects by providing a transceiver for a wireless handset, for example. The transceiver includes a switch for connecting an antenna to a receiver or to a transmitter. In a reception sub-frame, a limiting circuit switches the switch to an attenuated mode when an output signal of the receiver exceeds a predetermined value.

The transceiver further includes a disabling circuit which disables the limiting circuit in response to a disabling signal provided to the disabling circuit when the transceiver is in a traffic mode. Illustratively, a disabling switch is provided which is activated in the traffic mode to provide the disabling signal. For example, the disabling switch includes a light emitting diode, or is included in a controller of the transceiver. Illustratively, the disabling circuit includes a resistive network, or an AND gate, or a multi-vibrator, or a timer for disabling the limiting circuit in response to the disabling signal.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

Figure 1:
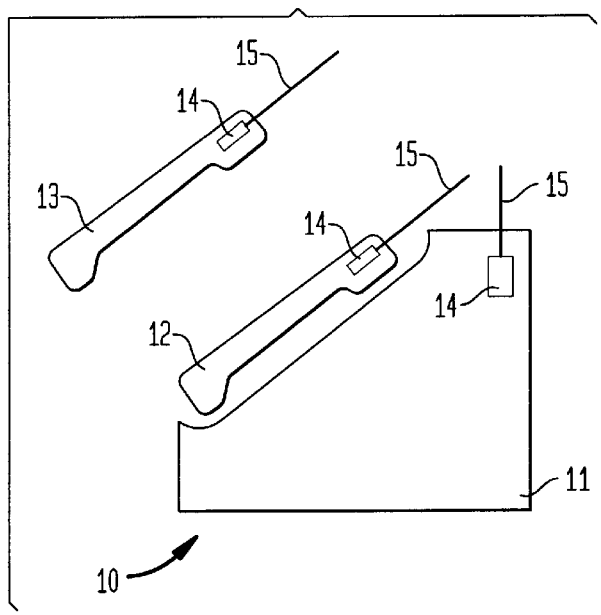
FIG. 1 shows a high power wireless telephone according to present invention.

FIG. 1 shows a wireless telephone, such as a high power cordless telephone system 10 having a base station 11 and one or more handsets. Illustratively, two handsets 12, 13 are shown in FIG. 1, where one handset 12 is near or on the base station for charging, while the other handset 13 is far away, e.g., approximately 1 mile away. Although the present invention is described using a cordless telephone as an illustrative example, it is understood by those skilled in the art that the present invention is equally applicable to any wireless mobile radio communication, such as cellular telephones or the like.

Figure 2:
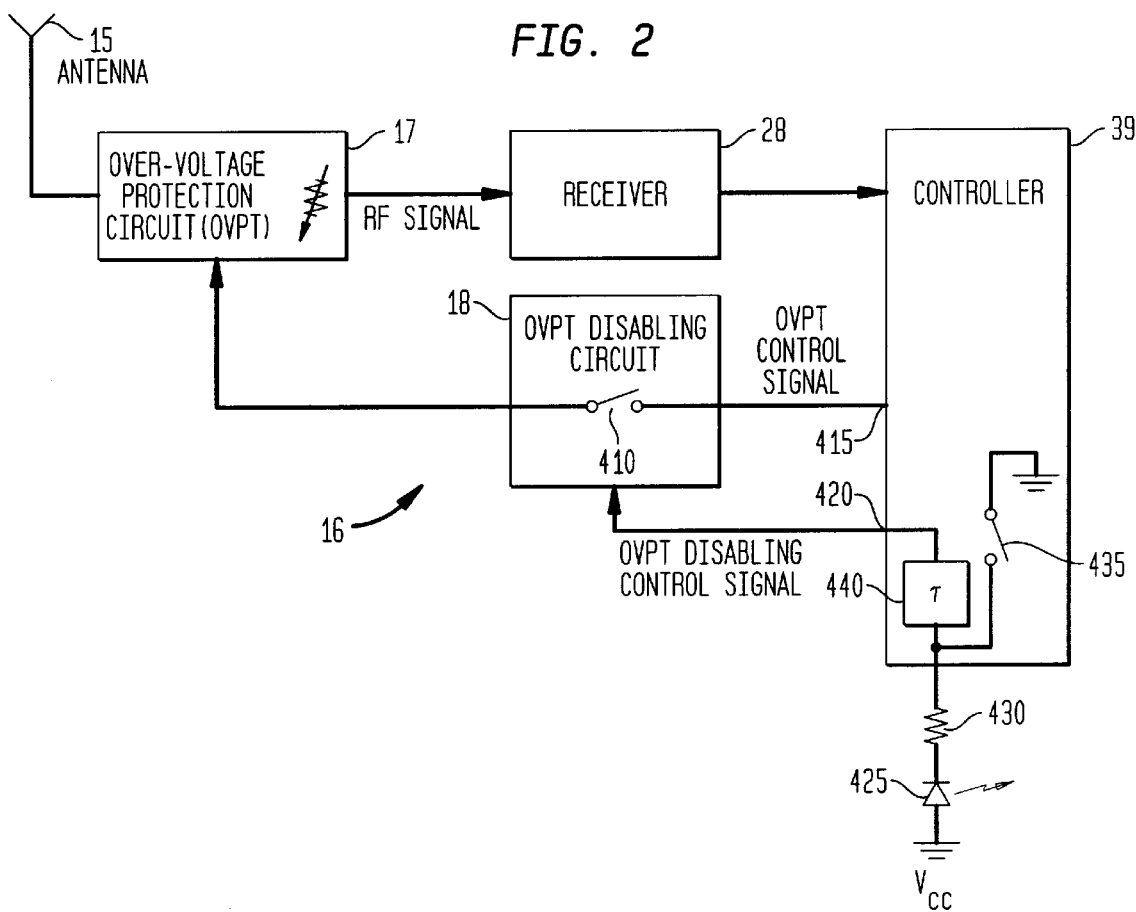
FIG. 2 shows a transceiver having a disabling circuit according to present invention.

Each of the units of the telephone system 10, namely the base 11 and two handsets 12, 13, has a transceiver 14 with an antenna 15 for transmitting and receiving signals therebetween. FIG. 2 shows a transceiver 16 having a limiting circuit 17, also referred to as an over-voltage protection (OVPT) circuit, and a disabling circuit 18 for disabling the limiting circuit 17. For clarity, a transmitter 26 shown in FIG. 3 has been omitted from FIG. 2.

Figure 3:
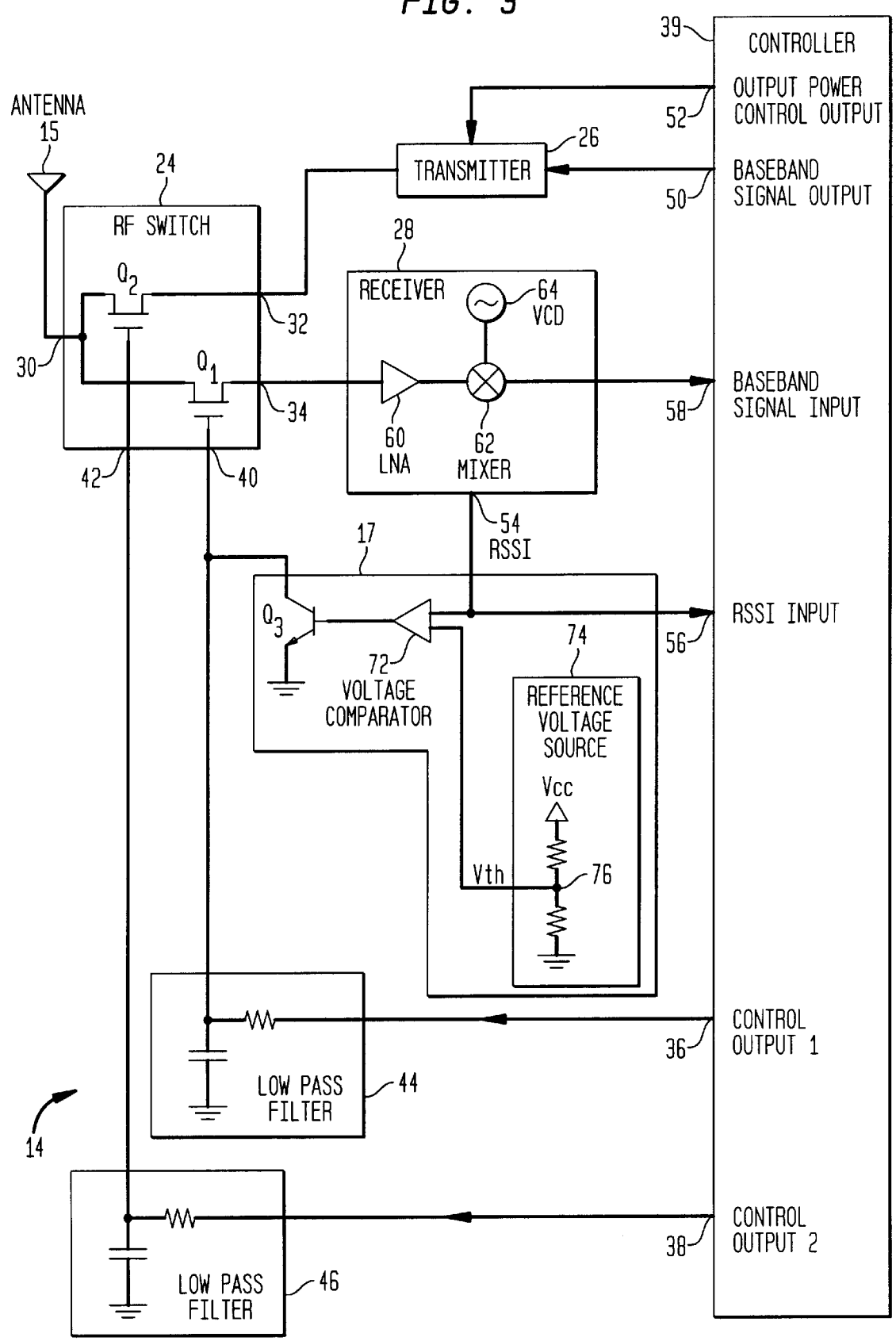
FIG. 3 shows the transceiver of FIG. 2 in greater detail according to present invention.

Prior to describing the disabling circuit 18, the transceiver 14 and limiting circuit 17 are first described with reference to FIG. 3, where for clarity the disabling circuit 18 of FIG. 2 is not shown in FIG. 3. As shown in FIG. 3, the transceiver 14 is a time division duplexer transceiver, for example, having a single antenna 15 for both transmitting and receiving. The transceiver 14 transmits during one time segment of its operation cycle where the receiver is off, referred to as a transmission sub-frame. Similarly, the transceiver 14 receives during another time segment or reception sub-frame where the transmitter is off. In addition to sharing the antenna, alternatively turning on the receiver and the transmitter one at a time for only a portion of the cycle time conserves power and extend battery recharge time.

As shown in FIG. 3, one embodiment of the transceiver 14 comprises a switch 24, such as a radio frequency (RF) switch, that selectively connects one at a time either an RF transmitter 26 or an RF receiver 28 to the antenna 15. The antenna 15 is connected to an antenna port 30 of the switch 24, while the transmitter 26 and receiver 28 are connected to the switch transmit and receiver ports 32, 34, respectively.

The switch 24 is controlled by control signals from control outputs 36, 38 of a controller 39. The controller 39 includes various elements for processing signals and controlling the telephone system, such as a time division duplexer (TDD), digital signal processors, micro-controllers or microprocessors, memory, analog-to-digital and digital-to-analog converters, audio circuits and the like, which are typically found and commonly used in wireless telephone systems as well known in the art. The control signals from the control outputs 36, 38 are provided to control inputs 40, 42 of the switch 24, through filters, such as low-pass RC filters 44, 46 which filter out transient spikes and high frequency components coupled to the control lines from the transmitter 26, for example.

Illustratively, the RF switch 24 includes power transistors, such as two field effect transistors (FETs) Q1, Q2, which receive the control signals at their gate. A high level on the control signals provided to the FET gates turns on the respective FETs to short together their respective source and drain. Turning on one of the FETs at any one time connects the antenna 15 to either the transmitter 26 or the receiver 28.

Specifically, in the receive mode of the handset or the base, the antenna 15 is connected to the receiver 28 and disconnected from the transmitter 26. This is achieved by having a high level on the first control input 40 (or gate of FET Q1), thus turning on the first FET Q1; and a low level on the second control input 42 (or gate of FET Q2), thus turning off the second FET Q2. The OFF second FET Q2 provides at least 20 dB attenuation, for example, thus in effect disconnecting the antenna 15 from the transmitter 26.

In the transmit mode of the handset or the base, the antenna 15 is connected to the transmitter 26 and disconnected from the receiver 28. This is achieved by having a low level on the first control input 40 (or gate of FET Q1), thus turning off the first FET Q1; and a high level on the second control input 42 (or gate of FET Q2), thus turning on the second FET Q2. The OFF first FET Q1 provides greater than 20 dB attenuation, for example, thus in effect disconnecting the antenna 15 from the receiver 28 and isolating it from the transmitter 26.

In the transmit mode, the transmitter 26 receives a baseband signal which contains the information to be transmitted from a baseband signal output port 50 of the controller 39. The transmitter 26 modulates the baseband signal for transmission thereof using one of many modulation schemes which are well known in the art. The transmitter 26 also receives a power control signal from a power control output port 52 of the controller 39. The power control signal adjusts the gain of a power amplifier of the transmitter 26 in order to transmit with the proper power level.

The power control level is provided in response to the power of the received signal from the receiver 28 and the bit error rate (BER) of the received signal. For example, when the received signal's power is high, indicating that the receiver is near the base or the base is transmitting at a high level, then the power control signal reduces the gain of the transmitter 26. Similarly, when the BER of the received signal is high, then the power control signal increases the gain of the transmitter 26 in order to reduce the BER to an acceptable level.

The transceiver 14 is located in both the handset and the base. Thus, it is understood by those skilled in the art that the power control adjustment occurs in the transmitter of the handset and/or the base. Illustratively, a received signal strength indicator (RSSI) signal from the receiver 28 is used to derive the power control signal which adjusts the gain of the transmitter 26. Instead of a proportional RSSI signal, a logarithmic RSSI signal is used for example. The logarithmic RSSI signal has a wide dynamic range and thus can be used to control the output power of the transmitted signal as well as the attenuation of the received signal. The logarithmic RSSI signal is a direct current (DC) signal which indicates the level of the RF signal received by the receiver 28, and is provided from an RSSI output port 54 of the receiver 28 to an RSSI input port 56 of the controller 39.

In the receive mode where Q1 is ON and Q2 is OFF, the receiver 28 detects a modulated signal from the antenna 15. Using demodulation schemes well known in the art, the receiver 28 demodulates the received signal and provides a baseband signal to a baseband input port 58 of the controller 39 for further processing, such as providing an audio signal to a speaker for hearing by a user of the telephone.

The receiver 28 includes a low noise amplifier (LNA) 60 which receives and amplifies the modulated RF signal received from the antenna 15. The amplified RF signal is provided to a mixer 62 which uses a carrier signal provided from an oscillator 64, such a voltage controlled oscillator (VCO), to demodulate the amplified RF signal and output the baseband signal to the baseband input port of the controller 39.

As described above, the receiver 28 also outputs the logarithmic RSSI signal to the RSSI input port 56 of the controller 39 for use in power control of the transmitter 26 in the transmit mode. In addition to the transmitter power control, the logarithmic RSSI signal is also used to control power levels, i.e., attenuation, of the input RF signal received by the receiver 28 in the receive mode in order to prevent overloading thereof. The power of the received signal is controlled without additional circuits in the receive path by using the RF switch 24 as an attenuator.

For received signal power control, the logarithmic RSSI signal is provided to a limiting circuit 17 which switches the switch 24 to reduce a level of modulated RF signal received by the LNA 60 from the antenna 15, when the level of the modulated RF signal as indicated by the RSSI signal exceeds a predetermined value.

In particular, the limiting circuit 17 includes a comparator 72 which compares the RSSI signal with the predetermined value also referred to as a reference or threshold voltage Vth signal provided from a reference voltage source 74. Illustratively, the reference voltage source 74 is a voltage divider comprising two resistors connected in series between a DC voltage source Vcc and ground, where the reference voltage signal is provided from a node 76 located between the two resistors.

The limiting circuit further includes a transistor, such as a bipolar pnp transistor Q3, which shunts to ground the first control input of the first transistor Q1 of the switch 24 when the RF modulated received signal level exceeds a certain value. This prevents saturation or overloading of the LNA 60. In particular, the comparator 72 compares its two inputs and when the RSSI signal exceeds the threshold voltage $V_{th}$, then the comparator 72 outputs a high signal.

The output of the comparator 72 is connected to the base of the shunt transistor Q3. As the power of the received signal increases, the DC voltage of the logarithmic RSSI signal also increases. When the RSSI voltage is greater than the threshold voltage $V_{th}$, then the output of the comparator goes from low to high. The high level of the comparator output signal turns on the shunt transistor Q3, thus switching the shunt transistor Q3 from open to close, where its emitter and collector become connected or shorted together.

The shunt transistor Q3 has its emitter connected to ground and its collector connected to the first control port 40 or gate of the first FET transistor Q1 of the switch 24. The ON shunt transistor Q3 with its emitter and collector shorted together, connects the gate of the first FET transistor Q1 to ground. This turns off (or opens) the first FET transistor Q1. In this mode, referred to as the attenuated receive mode, both FET transistors Q1, Q2 of the RF switch are off (or open).

In the attenuated receive mode, the RF switch attenuates the RF signal received from the antenna and provides an attenuated RF signal to the LNA 60. Illustratively, the RF switch provides 10 dB of attenuation in the attenuated receive mode. The attenuated RF signal prevents saturation or overloading of the LNA 60, maintains the SNR and BER at acceptable levels, and allows proper signal processing and establishing of a link between the handset and the base.

Table 1 shows the signal levels at the control inputs 40, 42 of the RF switch 24 in the three modes, namely, the transmit, receive and attenuated receive modes.

TABLE 1

| First Control Input (40) | Second Control Input (42) | Mode |
| --- | --- | --- |
| 0 | 1 | transmit |
| 1 | 0 | receive |
| 0 | 0 | attenuated receive |

In addition to switching, the RF switch is also used as an attenuator in the attenuated receive mode. In the receive mode, the RF switch does not create any additional RF signal loss in the receive path since there are no additional circuit elements.

The following are illustrative attenuation values provided by the RF switch 24 in the three modes. In the transmit mode, the RF switch 24 provides less than approximately 0.5 dB attenuation in the transmit path between its antenna port 30 and the transmit port 32, and a high insertion loss in the receive path, such as greater than approximately 20 dB of attenuation between the antenna port 30 and the receive port 34. In the receive mode, the RF switch 24 provides greater than approximately 20 dB attenuation in the transmit path, and a very low insertion loss in the receive path, such as less than approximately 0.5 dB of attenuation. Further, in the receive mode, the RF switch 26 provides high isolation between its transmit and receive ports 32, 34, such as greater than approximately 20 dB or 30 dB. In the attenuated receive mode, the RF switch 24 provides approximately 10 dB attenuation in the receive path between the antenna port 30 and the receive port 34.

In this attenuated mode where both FETs Q1, Q2 are OFF, the RF switch 24 also provides approximately 10 dB attenuation in the transmit path between the antenna port 30 and the transmit port 32. This 10 dB of isolation is sufficient since the transmitter 26 is not transmitting in the receive or the attenuated receive modes, which occur during the reception sub-frame. Note, in the transmit mode or transmission sub-frame where the transmitter 26 is transmitting, the 10 dB of isolation between the transmitter 26 and the receiver 28 is also sufficient, since any signals at the receiver 28 are discarded and not processed. The receiver 28 processes signal received only during the reception sub-frame.

Figure 4:
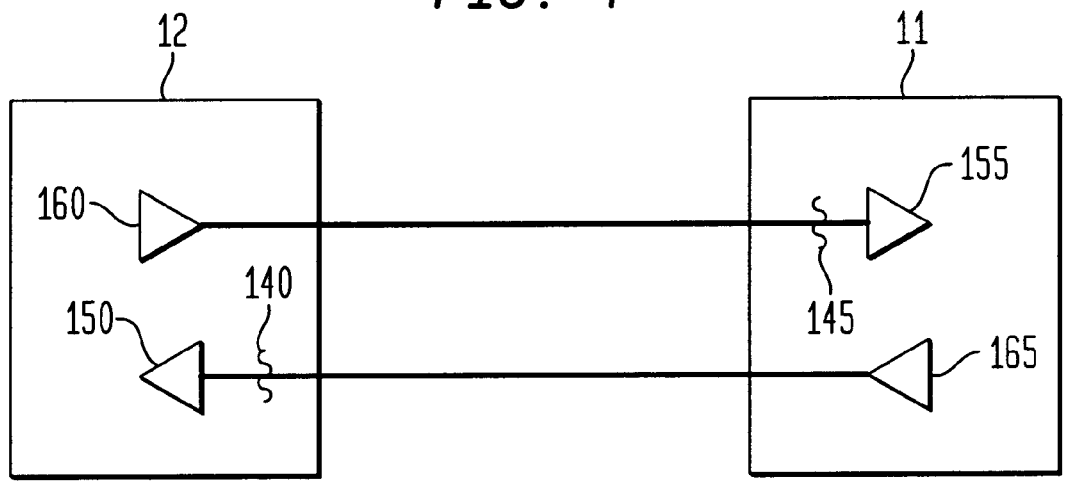
FIG. 4 shows a wireless telephone system having a limiting and disabling circuits for only the receivers of both the telephone handset and the base station according to the present invention.

Referring to FIGS. 3 and 4, the combination of the limiting circuit 17 and its disabling circuit 18, shown lumped together as reference numerals 140, 145, are provided in the receive section 150 of the handset 12 and in the receive section 155 of the base station 11, respectively. Alternatively, only either the handset 12 or the base 11 has the limiter/disabler combination 140. In these embodiments, the transmitter sections 160, 165 of the handset 12 and base 11 do not have the limiter/disabler combination 140.

Figure 5:
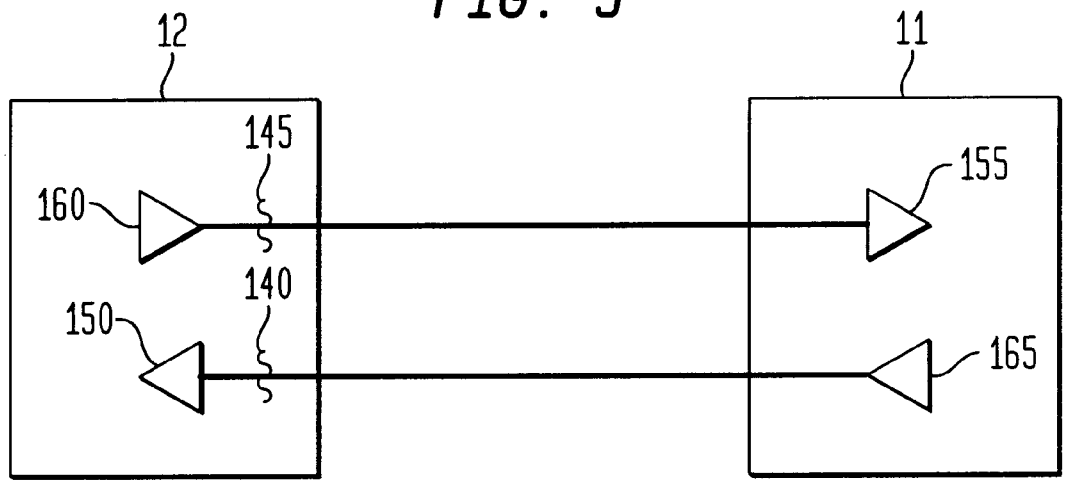
FIG. 5 shows a wireless telephone system having a limiting and disabling circuits for both the receiver and transmitter of the telephone handset according to the present invention.

In yet another embodiment, two limiter/disabler combination 140 are provided, one for the receiver 28 and another for transmitter 26 of either the handset 12 or the base 11. FIG. 5 shows the case where the limiter/disabler combinations 140, 145 are provided for the receiver 150 and transmitter 160 of the handset 12.

Returning to FIG. 2, the disabling circuit 18 is provided for disabling the limiting circuit 17 to prevent data/voice corruption resulting from switching between the normal receive mode and the attenuated receive mode during data/voice portions of a receive sub-frame.

At the beginning of a telephone operation, i.e., in the acquisition mode where a link between the handset and base is not established yet, acquiring a link is initiated by the handset or the base station. Since overloading the receiver prevents establishment of a link, the disabling circuit 18 is deactivated. Thus, if the received level is high in the acquisition mode, then the over-voltage protection circuit 17 is switched from the normal receive mode to the attenuated receive mode as described above. The attenuated received signal prevents overloading of the receiver 28 and allows establishment of the link.

Figure 6:
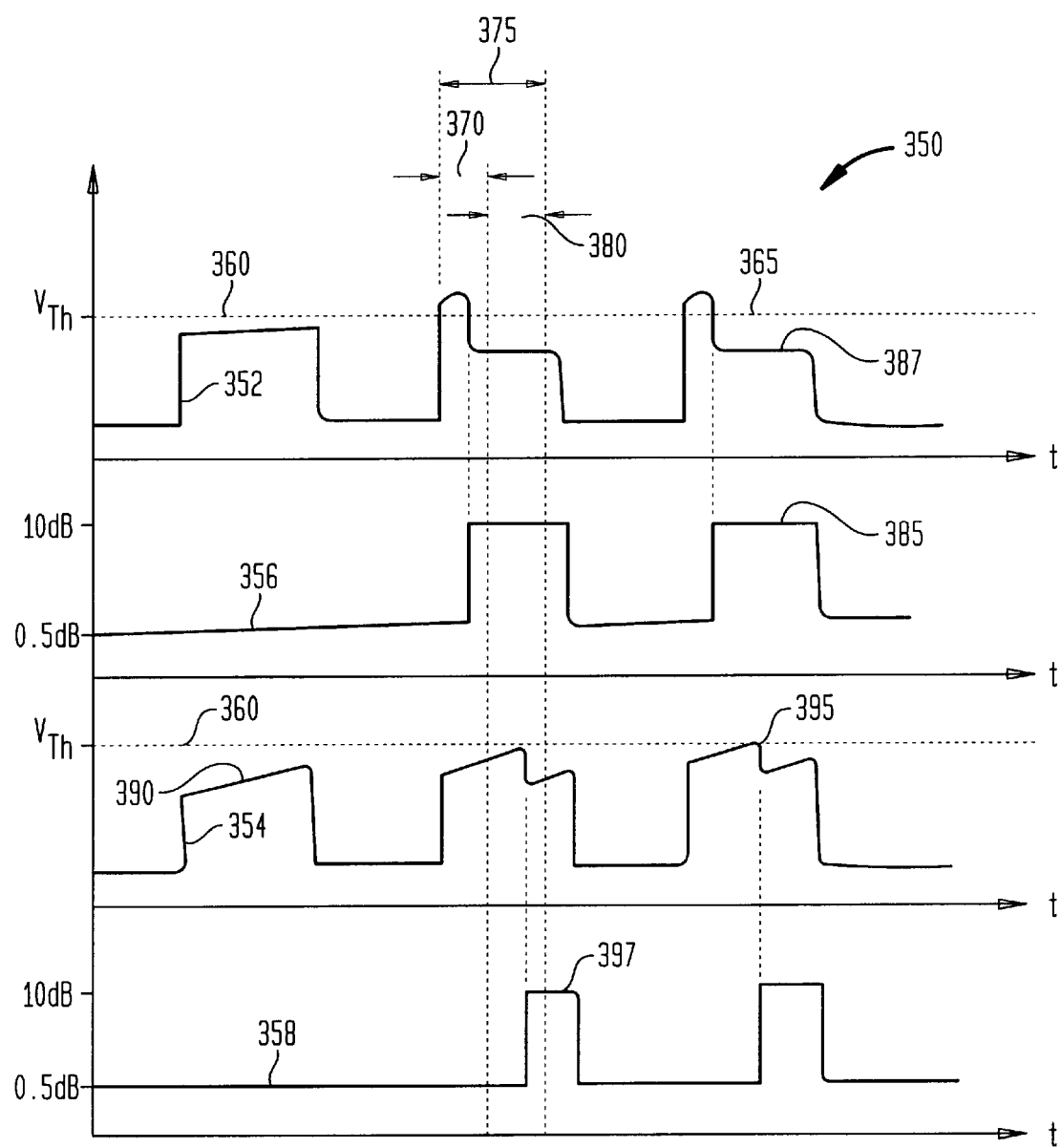
FIG. 6 shows plots of ideal and typical RSSI levels.

FIG. 6 shows plots 350 of ideal and typical RSSI levels 352, 354 versus time t, with associated attenuations 356, 358 in decibels (dB) of the RF switch 24, where the attenuation changes between approximately 0.5 dB to approximately 10 dB. Referring to FIGS. 6 and 2, in the ideal case 352, 356, when the signal received by the receiver 28 has a high level that saturates or overloads the receiver 28, then the ideal RSSI signal 352 instantaneously increases above the threshold level $V_{th}$ 360. This instantaneous RSSI increase 365 occurs at the beginning 370 of the receive sub-frame 375, where guard bits are present instead of data or voice bits which are present in the latter part 380 of the receive sub-frame 375.

Once the increased RSSI level 365 is above the threshold 360, the transceiver mode is switched from receive to attenuated receive mode where additional attenuation 385 is provided, e.g., 10 dB, to reduce the level of the received signal. The additional attenuation 385 also reduces the RSSI signal to a reduced level 387 which is below the threshold level 360. The switching from the receive mode to the attenuated receive mode and the increased attenuation 385 corrupt data and add noise. However in the ideal case, proper reception of data/voice occurs since any bit corruption occurs to the guard bits 370 and thus does not affect the actual data/voice bits 380.

The ideal case described above assumes that the RSSI signal increase instantaneously 365 with the increase in the level of the received signal. However, typically the RSSI signal does not increase instantaneously and has a certain slope 390. This delays switching from the normal receive mode to the attenuated receive mode.

Since the RSSI signal increase is not instantaneous in the non-ideal case, the RSSI increase above the threshold level 360 occurs after the guard bits 370 and during the voice/data portion 380 of the receive sub-frame 375. This is shown in FIG. 6 as numeral 395 where the attenuation 397 is increased to reduce the RSSI level during the voice/data portion 380. The switching from the receive mode to the attenuated receive mode and the increased attenuation 397 during the voice/data portion 380 corrupts the voice/data bits, causing noise and audio distortions to the voice conversation, referred to as pops and clicks.

To prevent data corruption resulting from switching between the receive and the attenuated receive modes during data/voice portion 380 of the receive sub-frame 375, the limiting circuit 17 (FIGS. 2–3) is disabled once the link is established. Typically the link is established after a security code is correctly detected and matched several times. The security code is unique for each phone set and is typically 12 bits occurring between the guard bits and the data bits of a frame. Once the security code is detected, the receiver synchronizes its counters to the incoming frame transmitted by the base. After synchronization has been established, the mode changes from the acquisition to the traffic mode, where the link is established and traffic frames containing voice data bits are exchanged between the base and handset.

It has been observed that overloading the receiver after the link is established, referred to as the traffic mode, is not as detrimental as the case where the receiver is overloaded before the link is established, referred to as the acquisition mode. Operation of the telephone in the acquisition mode is more sensitive to overloading of the receiver than operation in the traffic mode. Thus, it is more difficult to establish a link than to maintain an existing link during the same overloading conditions.

In particular, overloading the receiver in the acquisition mode often prevents link establishment. In contrast, overloading the receiver in the traffic mode does not necessarily cause the pops/clicks or data corruption that occur when the transceiver mode is switched from the receive mode to the attenuated receive mode during the voice/data portion 380, i.e., during the traffic mode. In the traffic mode, traffic frames containing voice data bits are exchanged between the handset and base. Accordingly, a disabling circuit is provided for disabling the limiting circuit 17 after the link is established.

Returning to FIG. 2, the operation of the disabling circuit 18 is described in the acquisition mode and the traffic mode. In the acquisition mode, the disabling circuit 18 is de-activated so as not to interfere with operation of the limiting circuit 17, while in the traffic mode, the disabling circuit 18 disables the limiting circuit 17 to prevent switching from the normal receive mode to the attenuated receive mode.

At the beginning of a telephone operation, i.e., in the acquisition mode where a link between the handset and base is not established yet, acquiring a link is initiated by the handset or the base station. Since overloading the receiver prevents establishment of a link, if the received level is high, then the over-voltage protection circuit 17 is switched to the attenuated receive mode as described above. In the acquisition mode, the over-voltage protection circuit 17 prevents overloading of the receiver 28 and allows establishment of the link by attenuating the high level of the received signal.

Once the link is established and the transceiver changes from the acquisition mode to the traffic mode, the disabling circuit 18 disables the over-voltage protection circuit 17. In the embodiment shown in FIG. 2, where the over-voltage protection circuit 17 is activated in response to an OVPT control signal from the controller 39, the disabling circuit 18 includes a switch 410 located between an over-voltage protection (OVPT) output port 415 of the controller 39 and the OVPT circuit 17.

The disabling switch 410 is controlled by an OVPT disabling control signal from an OVPT disable output port 420 of the controller 39. In particular, the disabling switch 410 is normally closed to allow the OVPT signal from the OVPT control port 415 to reach the OVPT circuit 17 for providing additional attenuation when desired, i.e., when the received signal level is high. Once a link is established between the handset and base station, the disabling signal opens the disabling switch 410, thus disabling the OVPT circuit 17 by preventing the OVPT control signal from reaching the OVPT circuit 17. Thus, once the link is established the OVPT circuit 17 is disabled and the transceiver is never in the attenuated receive mode, even when the received signal saturates or overloads the receiver 28.

In the embodiment shown in FIG. 2, the disabling signal is provided from pre-existing control signal which indicated establishment of a link, such as a signal which turns on a light emitting diode (LED) 425 present in a typical wireless phone. As is well known in the art, a typically LED phone circuit has the LED 425, a current limiting resistor 430 and a switch 435 such as a bipolar junction (BJ), metal oxide (MOS), or complimentary metal oxide (CMOS) transistor that cause the LED to turn on when a link is established. For example, the switch 435 is closed to provide a ground connection when the link is established, thus allowing current to flow from a voltage source Vcc to ground through the LED 425 and current limiting resistor 430. To increase reliability, the OVPT signal may include a predetermined time delay $\tau$ after link establishment, e.g., 1–3 seconds. Illustratively, the time delay is provided by a delay circuit 440.

Disabling the OVPT circuit 17 once the link is established, prevents data corruption or noise during voice conversations which occur when switching 395 (FIG. 6) from the normal receive mode to the attenuated receive mode during data/voice portion of a receive sub-frame as shown by numeral 395 in FIG. 6.

The disabling signal may be derived from signals other than the signal which turns on the LED 425. For example, a special micro-controller output is used to disable the OVPT circuit after the link is established. Further, when a transmitter control signal 52 (FIG. 3) is provided from the micro-controller 39 to control the output power of the transmitter 26 (FIG. 3), this transmitter control signal may be used to derive the disabling signal, for example.

After the link is established at short range, i.e. at high received signal, the RSSI signals in handset and base are strong and exceed the threshold levels set in handset and base. The handset and base micro-controller decrease the output power of the handset and base transmitters. It takes a few second, e.g., 2–3 seconds, after which the OVPT or limiting circuit 17 is not required. However, the limiting circuit 17 remains functioning and can cause errors e.g., pops and clicks. The errors and data corruption occur since the limiting circuit 17 is not instantaneously disabled for the reasons described above, namely, due to the margin on the RSSI threshold levels caused by RF integrated chip RSSI level variations, temperature variations, and the slope 390 of the increasing RSSI level shown in FIG. 6.

Various circuits and methods may be used to disable the OVPT circuit 17. Illustratively, the following circuits may be used to disable OVPT circuit 17, e.g., to disable the shunt transistor Q3: a control voltage disabling circuit; an AND logic circuit, a one shot multi-vibrator circuit or a widely used 555 timer.

Figure 7:
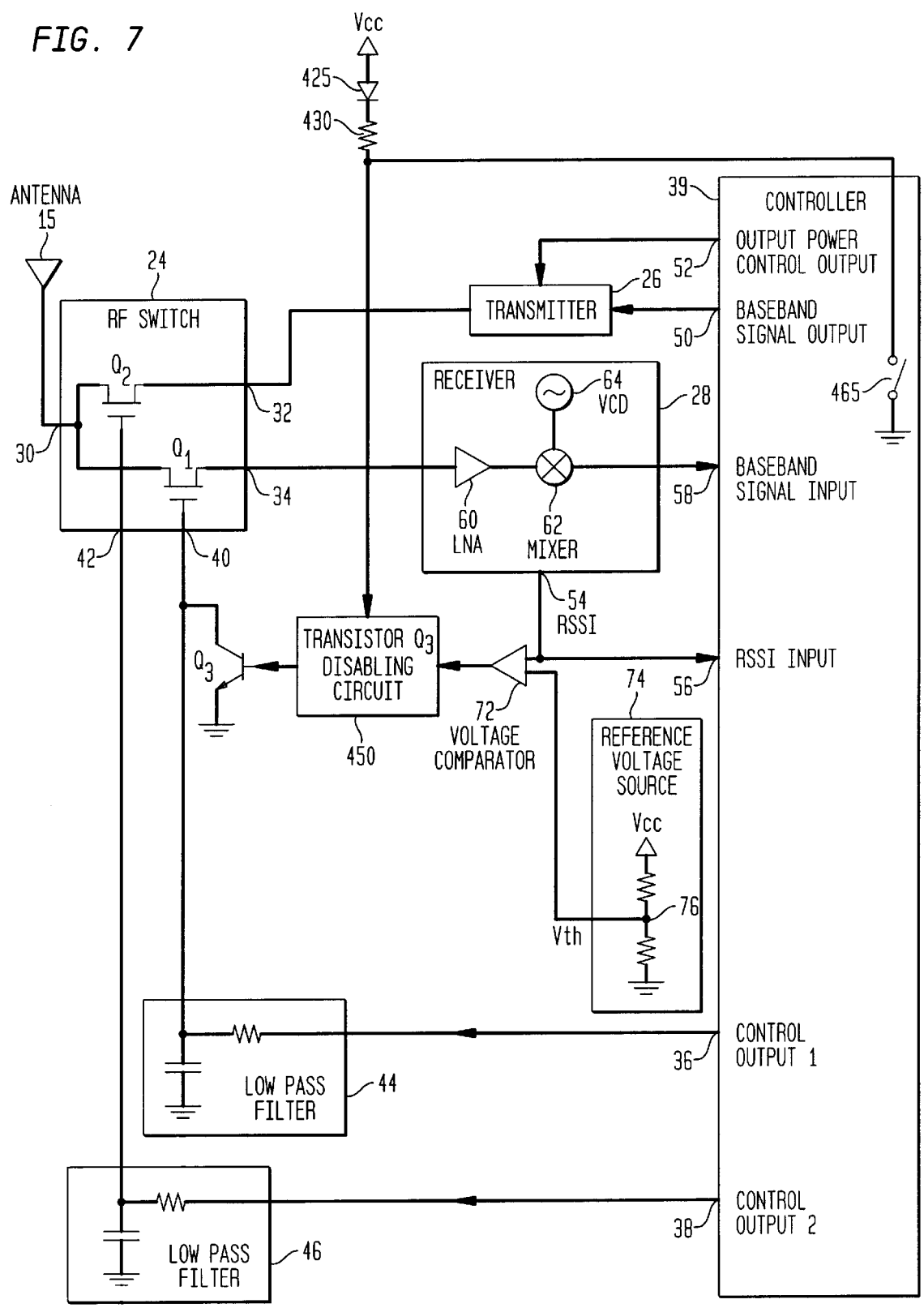
FIGS. 7–13 show other embodiments of the disabling circuit shown in FIG. 2 according to the present invention.

FIG. 7 shows a disabling circuit 450 for disabling the shunt transistor Q3 after the link is established. In particular, the disabling circuit 450 receives a link ON signal from the LED 425.

Figure 8:
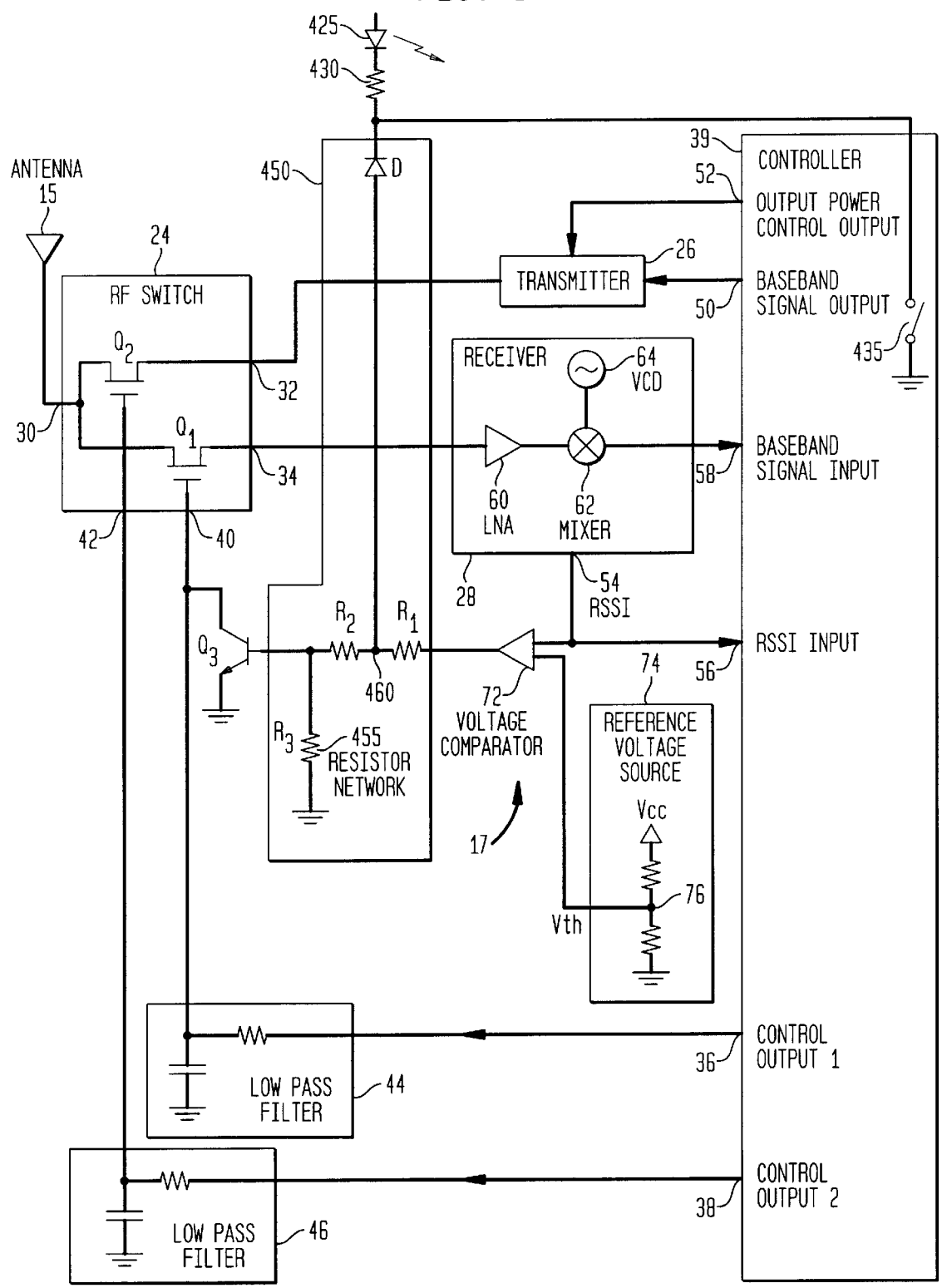

FIG. 8 shows one embodiment of the disabling circuit 450. Illustratively, the disabling circuit 450 includes a diode D. A resistor network 455 may be provided if necessary to provide proper biasing to turn ON the shunt transistor Q3 in the acquisition mode when the received or RSSI signal is above the threshold level $V_{th}$. The resistor network 455 includes first and second resistors $R_1$, $R_2$, which are connected in series between the output of the comparator 72 and the base of the shunt transistor Q3. The two resistors $R_1$, $R_2$ are inter-connected at a node 460. A third resistor $R_3$ is connected between base of the shunt transistor Q3 and ground. The diode D has its anode connected to node 460 and its cathode connected to the current limiting resistor 430.

The diode D protects the base of the shunt transistor Q3 from the high voltage Vcc provided through the LED 425 when the link is not established and the switch 435 is open. The open switch 435 prevents grounding the cathode of the diode D and pulls up the cathode to the high voltage Vcc. When the link is not established the grounding switch 435 is open providing a high impedance. Thus, the limiting circuit 17 operates normally without any interference from the disabling circuit 450.

When the link is established and the grounding switch 435 is ON to provide a ground connection and thus a low impedance, the node 460 is nearly shunted to ground through the diode D and closed grounding switch 435. The voltage on the base of the shunt transistor Q3 is low despite the RSSI signal 54 being higher than the threshold level $V_{th}$. The low clamped output of the comparator 72 prevents turning ON the shunt transistor Q3, thus in effect disabling the limiting circuit 17.

Once the link is established, there is typically an inherent delay of approximately 0.1 to 0.5 seconds before the switch 435 closes and the LED 425 turns ON. This delay is advantageous as it ensures that the link has already been established. If desired, an additional time delay may be introduced using a delay circuit 440 (FIG. 2).

Figure 9:
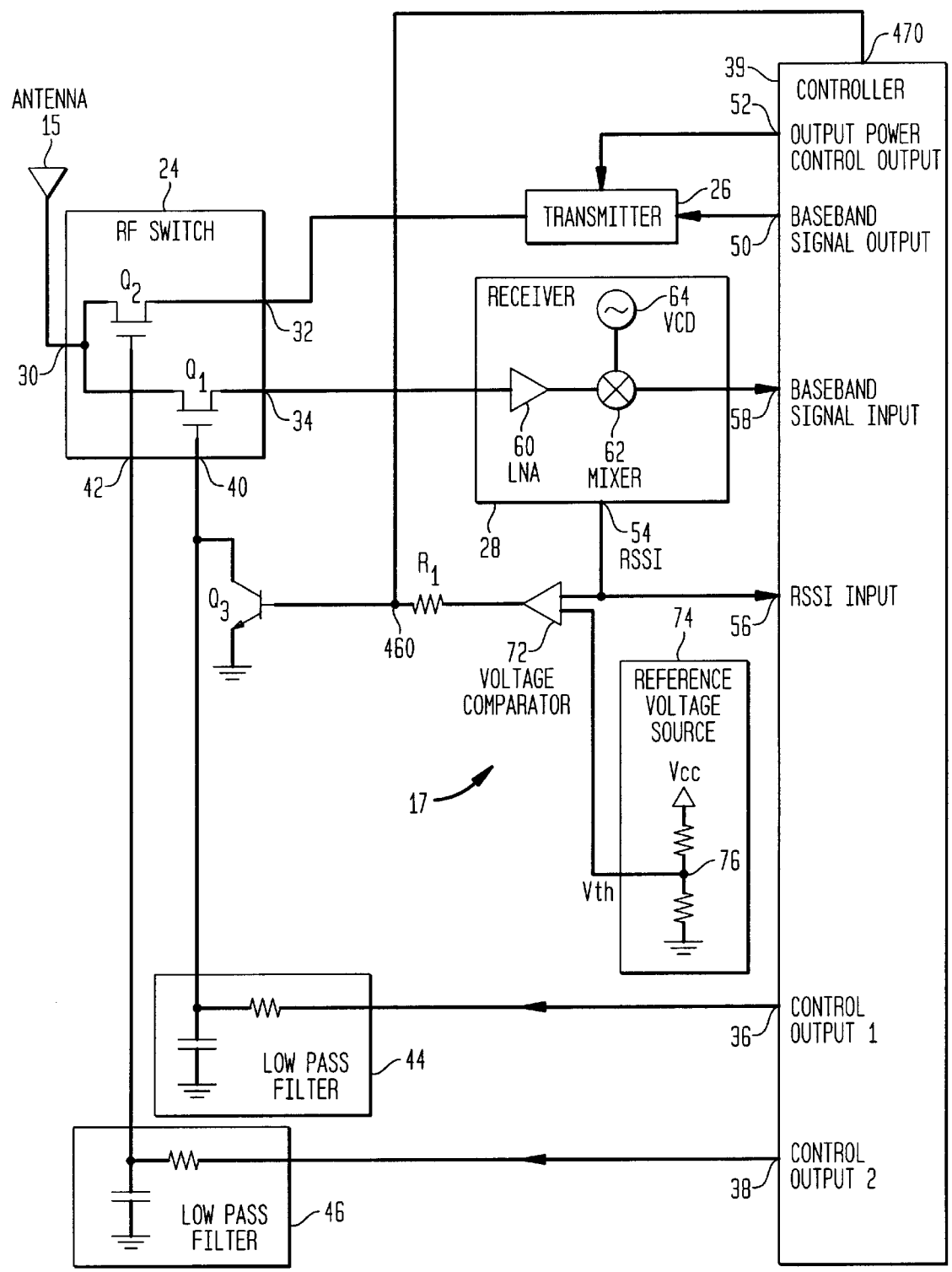

FIG. 9 shows another embodiment of the disable circuit, where a special output 470 of the controller 39 provides a low impedance level after the link is established, e.g., after approximately 1–2 seconds. This low impedance level has similar affect as the switch 435 shown in FIG. 8 in the closed position providing a ground connection. In particular, the low impedance level clamps the voltage on the node 460 at a low voltage level even when the RSSI signal 54 is higher than the threshold level $V_{th}$. The low clamped voltage on the node 460 prevents turning ON the shunt transistor Q3, thus in effect disabling the limiting circuit 17. When the link is not established, the special output 470 has a high impedance state. Similar to the switch 435 shown in FIG. 8 in the open position, the high impedance level or state of the special output 470 does not effect the operation of the OVPT or limiting circuit 17.

Figure 10:
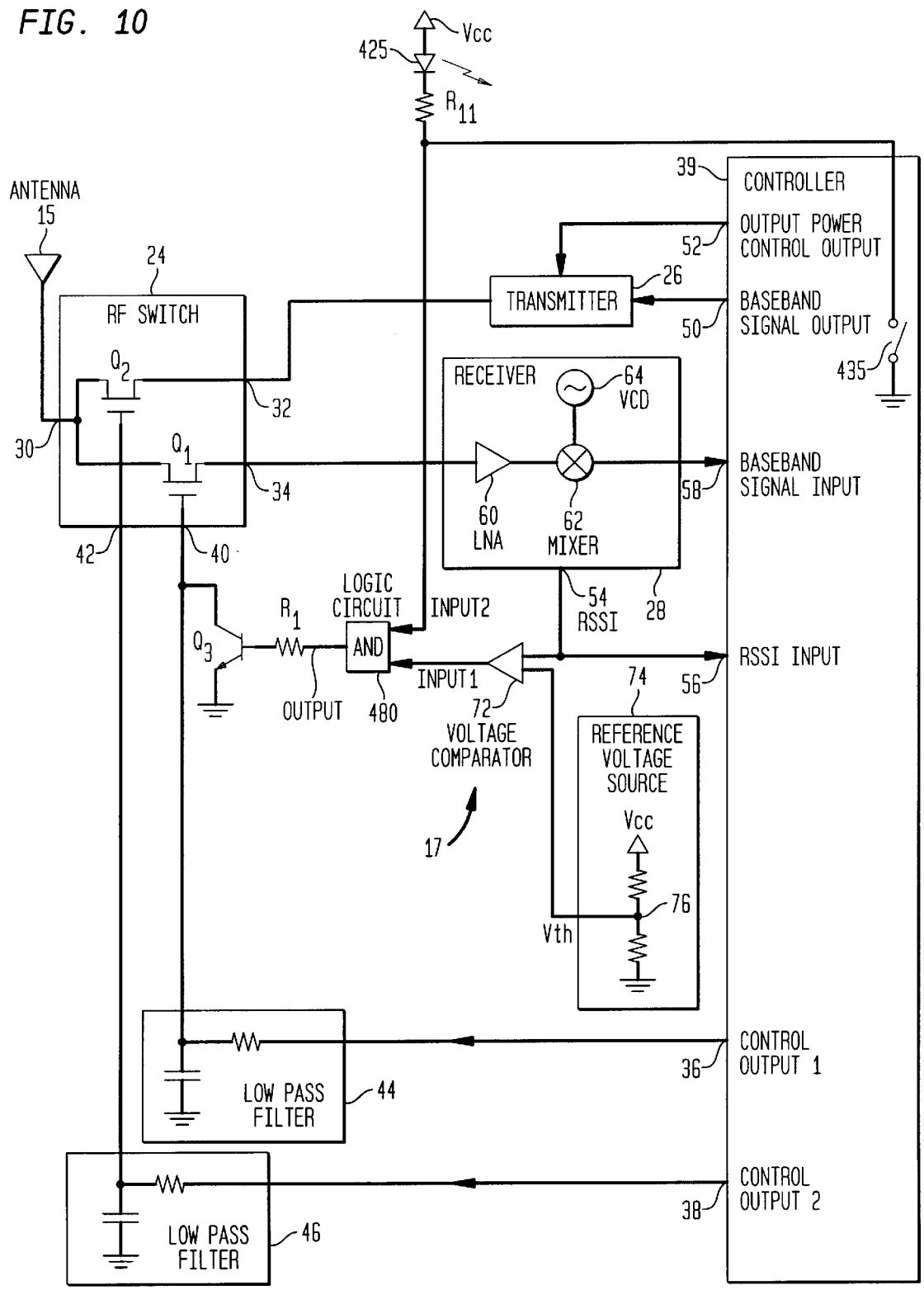

FIG. 10 shows yet another embodiment of the disable circuit, where an AND gate 480 is used. Illustratively, the AND gate 480 has two inputs; one input connected to the output of the comparator 72, and another input connected to the LED 425 though a resistor $R_{11}$ and to the switch 435. The switch 435 is closed when the link is established to provide a connection to ground, i.e., a low level to one of the input of the AND gate 480. This low AND gate input disables the AND gate 480 to provide a low AND gate output, even when other AND gate input, i.e., comparator output, is high thus disabling the limiting circuit 17. The current limiting resistor R1 may be provided between the AND gate output and the base of the shunt transistor Q3 to limit the base current.

Figure 11:
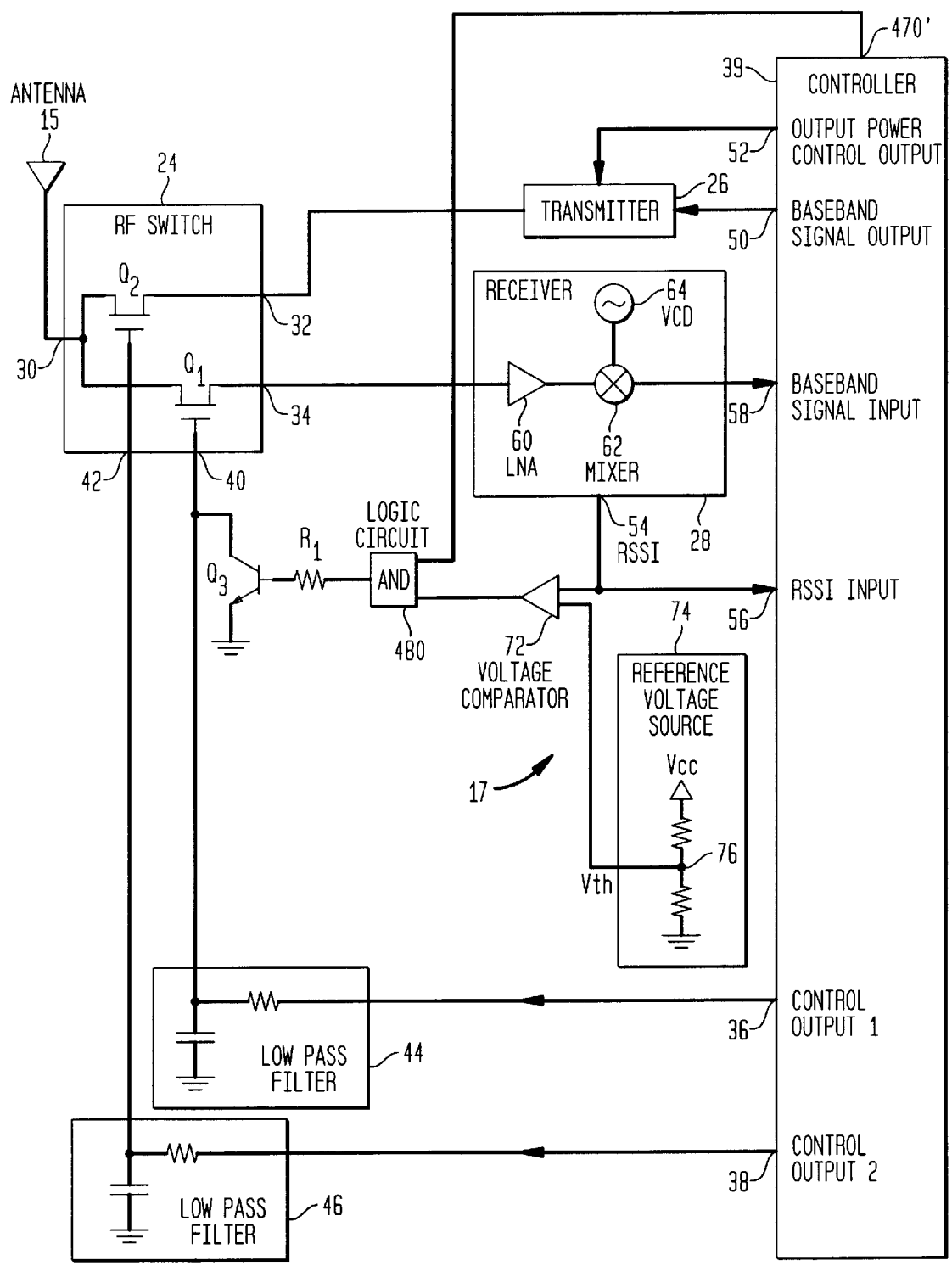

FIG. 11 shows a further embodiment of the disable circuit, where one of the inputs of the AND gate 480 is not connected to the LED shown in FIG. 10. Rather, this AND gate input is connected to a special controller output 470'. When the link is established, the special output 470' has a low voltage level to pull down the output of the AND gate even when the other AND gate input, i.e., comparator outport, is high. The low voltage level of the AND gate output turns OFF the shunt transistor Q3 to disable the limiting circuit 17.

Figure 12:
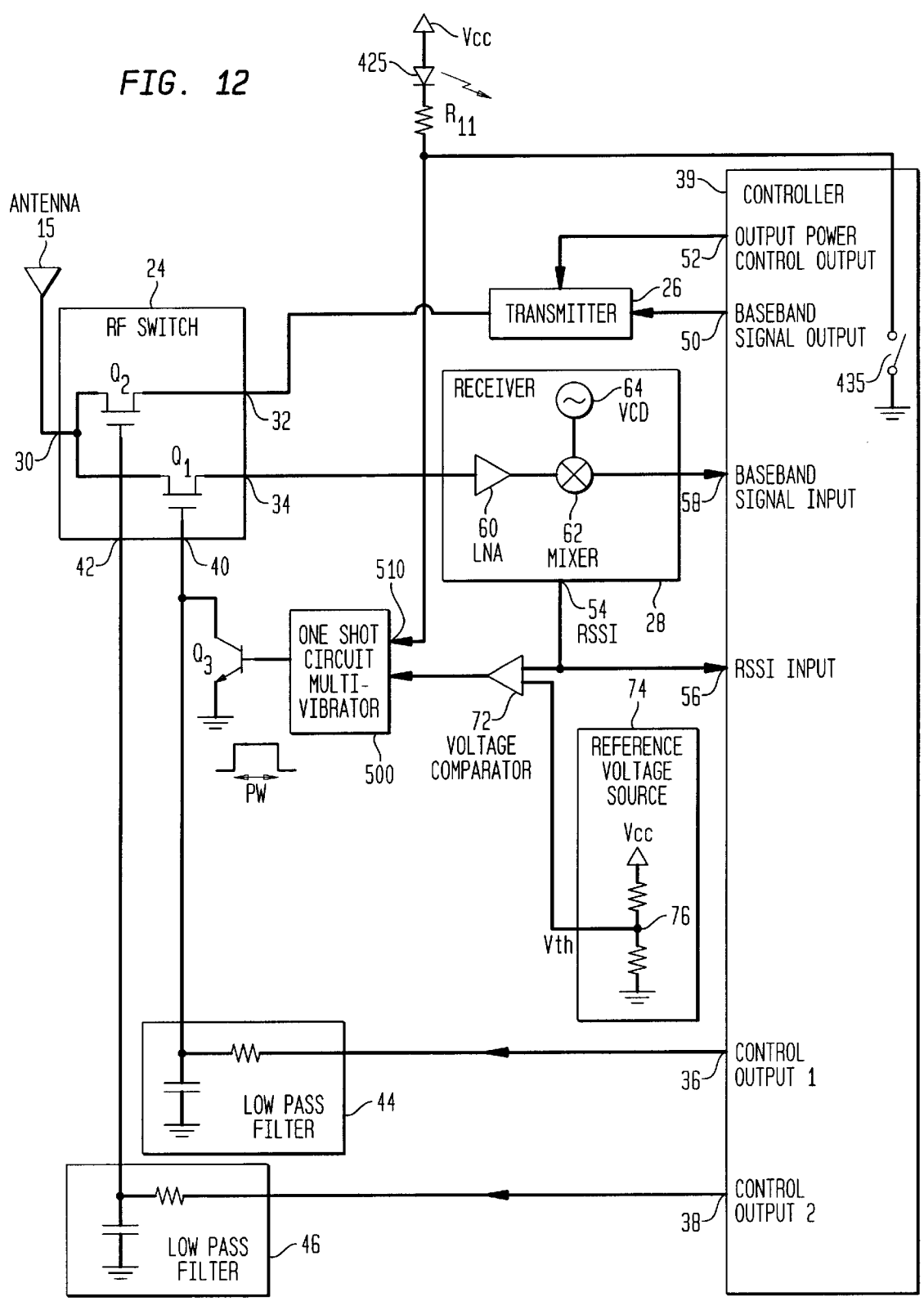

FIG. 12 shows a still further embodiment of the disable circuit which is similar to the embodiment shown in FIG. 10, except that the AND gate 480 of FIG. 10 is replaced with a one shot circuit or multi-vibrator 500, for example. In particular, a disable reset input 510 of the multi-vibrator 500 is connected to the LED 425 through the current limiting resistor $R_{11}$ which limits the LED ON current, i.e., $I_{LED\_ON} < I_{LED\_MAX}$. The disable reset input 510 is also connected to one terminal of the grounding switch 435 having its other terminal connected to ground.

Similar to the embodiment in FIG. 11, a variation of the embodiment shown in FIG. 12 dispenses with the connection between the multi-vibrator disable reset input 510 and the LED 425. In this case, the multi-vibrator disable reset input 510 is connected only to the switch 435.

When the multi-vibrator disable reset input 510 is low, i.e., when the link is established and the switch 435 is closed to provide a ground connection, then the output of the multi-vibrator 500 is also low, thus turning OFF the shunt transistor Q3 and disabling the limiting circuit 17 even when the output of the comparator 72 is high. Note, the output of the multi-vibrator is also low when its second input, i.e., the output of the comparator 72, is low.

When the multi-vibrator disable reset input 510 is high, i.e., link has not been established yet, then a high output of the comparator 72 provides a pulse at the output of the multi-vibrator 500 which has a pulse width PW. This pulse width PW is greater than the time required to get a link, i.e, PW>nT where n is the number of frames required to establish a link, and T is the duration of a full frame.

During the pulse width PW, the limiting circuit 17 is enabled, i.e., the shunt transistor Q3 is turned ON, to ground terminal 40 of the RF switch 24 and switch the mode to the attenuated receive mode for allowing link establishment. After time PW and thus establishment of the link, i.e., end of the acquisition mode and beginning of the traffic mode, the multi-vibrator output goes low to turn OFF the shunt transistor Q3 and disable the limiting circuit 17. This switches the mode from the attenuated receive to the receive mode and maintains the receive mode despite a high output of the comparator 72 to prevent errors during the traffic mode.

Figure 13:
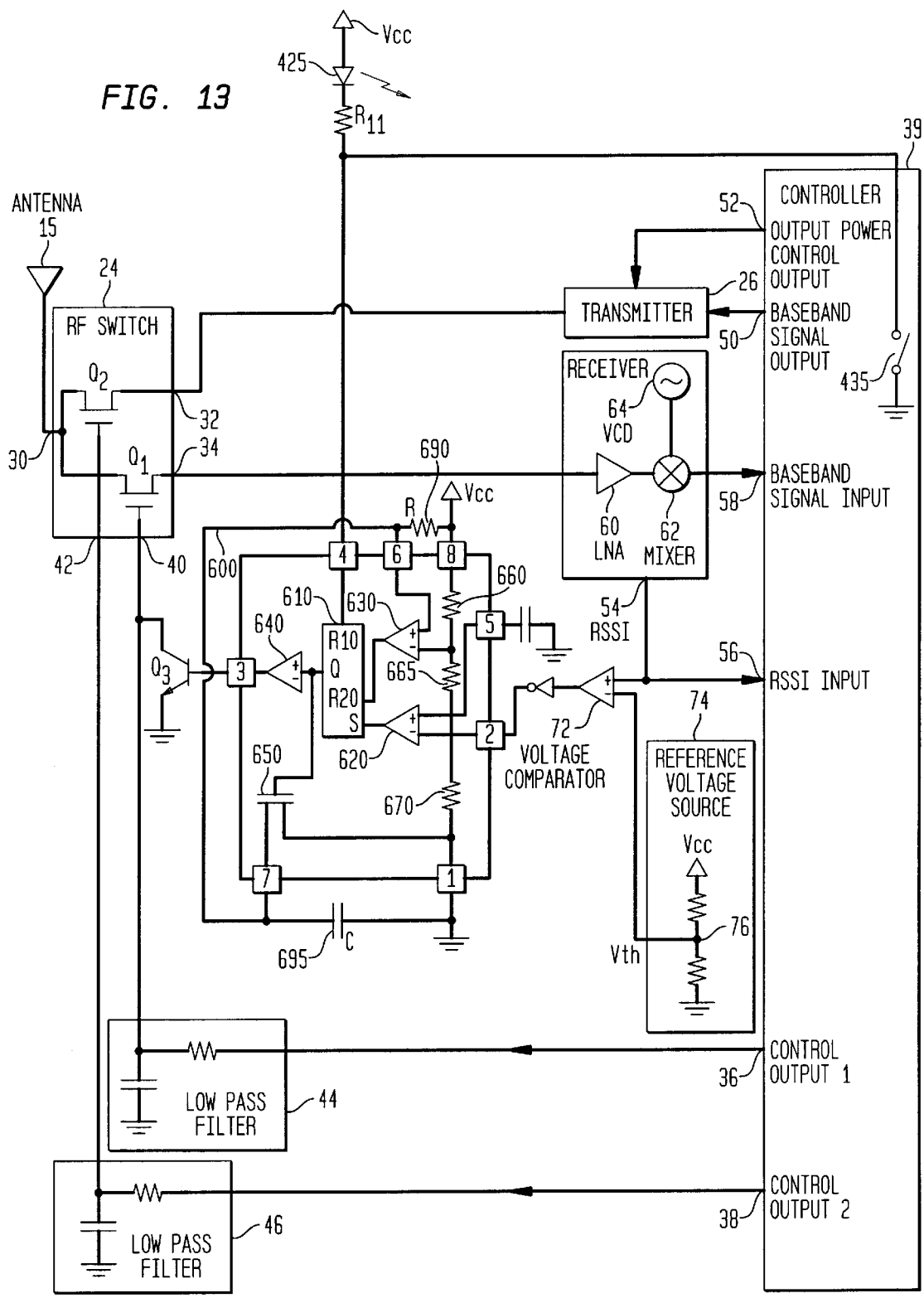

FIG. 13 shows a another embodiment where the disable circuit 450 (see also FIG. 7), is replaced by a timer 600, such as 555 timer, part number TS555 manufactured by SGS-THOMSON. As is well known in the art, the 555 timer has an RS flip-flop 610 with two reset inputs $R_{10}$ and $R_{20}$ and a set input S. A first comparator 620 has its output connected to the S input and a second comparator 630 as its output connected to the second reset input $R_{20}$.

The first flip-flop reset input $R_{10}$ is a reset input to the timer integrated chip (IC) at pin 4. The output Q of the flip-flop 610 is connected to an inverter 640 whose output is connected to output pin 3 of the timer IC. The timer 555 also includes a transistor 650 having its gate connected to the flip-flop output Q. The transistor 650 has a drain connected to the IC output pin 7 and a source connected to an IC input pin 1 which is typically grounded.

A power pin 8 of the timer IC is connected to Vcc. Three resistors are connected in series between the power pin 8 and the ground pin 1, where the terminal between the first and second resistors 660, 665 is connected to the inverting input of the second comparator 630, and the terminal between the second and third resistors 665, 670 is connected to the non-inverting input of the first comparator 620.

The inverting input of the first comparator 620 is connected to a trigger input 2 of the timer IC and the non-inverting input of the second comparator 630 is connected to a threshold input 6 of the timer IC. Further, the inverting input of the second comparator 630 is connected to a control voltage input 8 of the timer IC.

The first reset input $R_{10}$, or IC reset pin 4, is connected to the LED 425 through the current limiting resistor 430 and to the grounding switch 435, which closes to provide a ground connection when the link is established, i.e., in the traffic mode. The low first reset input $R_{10}$ in the traffic mode disables the limiting circuit 17 by providing a low signal at the output 3 of the IC timer, irrelevant of the signal levels of the second reset input $R_{20}$ and the set input S. Thus, when the first reset flip-flop input $R_{10}$ at pin 4 is low (traffic mode), then the output of the 555 timer at pin 3 is low, thus disabling the shunt transistor Q3 and placing the transceiver in the normal receive mode even when the received or RSSI signal is high.

The threshold input 6 of the IC timer is pulled up to Vcc through a pull-up resistor. Further, the timer control voltage input 5 (or non-inverting input of the first comparator 620) is capacitively coupled to ground, while the IC trigger input 2 (or inverting input of the first comparator 620) is connected to the output of the comparator 72 through an inverter 680. In addition, the timer IC discharge output 7, or drain of the transistor 650, is connected the Vcc through the pull-up resistor.

As is well known to one skilled in the art, the timer 555 is operated in the monostable mode to function as a one-shot. In particular, with the reset input at pin 4 pulled high, i.e., acquisition mode where the switch 435 is open, a falling edge or transition from high to low at the trigger input at pin 2 causes a one-shot output pulse on the timer output at pin 3. The pulse-width of the output pulse is determined by the RC time constant of a resistor 690 and a capacitor 695 connected in series between the power pin 8 or Vcc and ground at pin 1. The node inter-connecting the resistor 690 and a capacitor 695 is connected to the drain of the transistor 650 at pin 7.

The limiting circuit 17 is enabled by the high voltage level during the pulse-width of the IC output pulse, which is due to the falling edge of the output of the inverter 680 and thus due to the rising edge of the output of the comparator 72. In particular, the high IC output 3 turns on the shunt transistor Q3 to ground terminal 40 of the RF switch and switch the transceiver mode from the normal receive mode to the attenuated receive mode.

The pulse-width of the IC output pulse is chosen to allow establishment of the link. Once the high level of the one-shot output pulse drops, the limiting circuit is disabled and the mode switched from the attenuated receive mode the normal receive mode despite having a high voltage level at the output of the comparator 72 indicating a high received or RSSI signal.

Further, due to the reset input at pin 4 being grounded from the closed switch 435 in the traffic mode, the timer output at pin 3 is at a low voltage level, thus keeping the limiting circuit 17 disabled. This maintains the normal received mode in the traffic mode despite a high RSSI signal and prevents switching to the attenuated receive mode. Note, with modifications apparent to one skilled in the art, the comparator 72 and inverter 680 may be deleted and replaced with a first comparator 620 of the timer 600, for example.

Illustratively, the transceiver is incorporated in high power cordless telephone system that use frequency hopping, where the frequency (or channel number) of the receive and transmit signals are changed, e.g., every 5 msec. The disabling circuit consumes minimal real estate if any. Typically no additional real estate or components are needed, since the elements of the disabling circuit are likely to be available as unused portions of chips forming the handsets or base stations. Thus, the disabling circuit allows for miniaturization of the transceiver and prevents increased cost, data corruption and pops or clicks.

The transceiver is used with any type of transmission line, including micro-strip transmission line type devices, and hence can be used in wireless telephones. The transceiver is particularly suited for high power cordless phones and cellular phones. The transceiver allows a high power cordless phone to have more than one handset without any substantial system limitations on the telephone range and the transmitted power level.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

What is claimed is:

1. A transceiver comprising:
   a switch which provides a switched signal in response to a received signal;
   a receiver which receives said switched signal;
   a limiting circuit which switches said switch to an attenuated mode to reduce a level of said switched signal when an output signal of said receiver exceeds a predetermined value when said transceiver is in a control mode; and
   a disabling circuit which disables said limiting circuit in response to a disabling signal when said transceiver is in a traffic mode.

2. The transceiver of claim 1, further comprising a disabling switch which is activated in said traffic mode to provide said disabling signal.

3. The transceiver of claim 2, wherein said disabling switch includes a light emitting diode.

4. The transceiver of claim 2, wherein said disabling switch is included in a controller of said transceiver.

5. The transceiver of claim 1, further comprising a controller for providing said disabling signal in said traffic mode.

6. The transceiver of claim 1, wherein said disabling circuit includes a resistive network to disable said limiting circuit in response to said disabling signal.

7. The transceiver of claim 1, wherein said disabling circuit includes an AND gate which disables said limiting circuit in response to said disabling signal.

8. The transceiver of claim 1, wherein said disabling circuit includes a multi-vibrator which disables said limiting circuit in response to said disabling signal.

9. The transceiver of claim 1, wherein said disabling circuit includes a timer which disables said limiting circuit in response to said disabling signal.

10. A wireless handset comprising:
    an antenna;
    a receiver which receives a switched signal;
    a transmitter which transmits a transmitted signal;
    a switch having an antenna terminal connected to said antenna, a receive terminal connected to said receiver, and a transmitter terminal connected to said transmitter;
    a limiting circuit which switches said switch to an attenuated mode to reduce a level of said switched signal when an output signal of said receiver exceeds a predetermined value when said wireless handset is in a control mode; and
    a disabling circuit which disables said limiting circuit in response to a disabling signal when said wireless handset is in a traffic mode.

11. The wireless handset of claim 10, further comprising a disabling switch which is activated in said traffic mode to provide said disabling signal.

12. The wireless handset of claim 11, wherein said disabling switch includes a light emitting diode.

13. The wireless handset of claim 11, wherein said disabling switch is included in a controller of said wireless handset.

14. The wireless handset of claim 10, further comprising a controller for providing said disabling signal in said traffic mode.

15. The wireless handset of claim 10, wherein said disabling circuit includes a resistive network to disable said limiting circuit in response to said disabling signal.

16. The wireless handset of claim 10, wherein said disabling circuit includes an AND gate which disables said limiting circuit in response to said disabling signal.

17. The wireless handset of claim 10, wherein said disabling circuit includes a multi-vibrator which disables said limiting circuit in response to said disabling signal.

18. The wireless handset of claim 10, wherein said disabling circuit includes a timer which disables said limiting circuit in response to said disabling signal.

19. A wireless handset comprising:
    an antenna;
    a receiver which receives a switched signal;

a transmitter which transmits a transmitted signal;

a switch for connecting said antenna, one at a time, to said receiver or to said transmitter, said switch having an attenuated mode for reducing levels of signal passing therethrough;

a limiting circuit which switches said switch to said attenuated mode when an output signal of said receiver exceeds a predetermined value when said wireless handset is in a control mode; and a disabling circuit which disables said limiting circuit in response to a disabling signal when said wireless handset is in a traffic mode.

20. The transceiver of claim 19, further comprising a disabling switch which is activated in said traffic mode to provide said disabling signal.

21. A transceiver comprising:

switching means for providing a switched signal in response to a received signal;

receiving means for receiving said switched signal;

limiting means for limiting a level of said switched signal by switching said switching means to an attenuated mode when an output signal of said receiving means exceeds a predetermined value when said transceiver is in a control mode; and disabling means for disabling said limiting means in response to a disabling signal when said transceiver is in a traffic mode.

* * * * *